Figure 1:
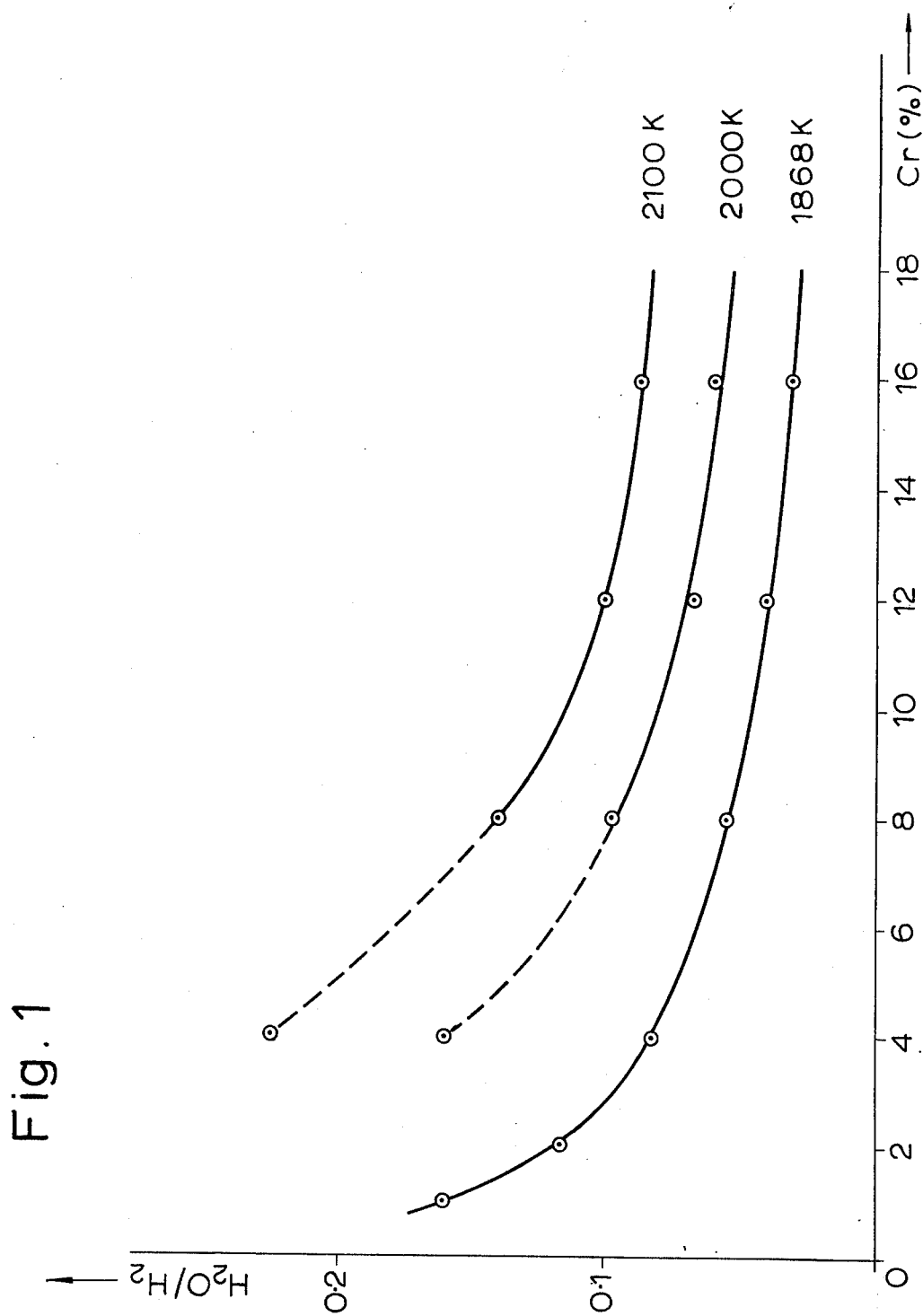

United States Patent [19]

Nixon

[11] 4,029,497

[45] June 14, 1977

[54] MANUFACTURE OF ALLOY STEELS AND FERROUS ALLOYS

[76] Inventor: Ivor Gray Nixon, ler Stock Ost, "Matterhorgruss", Zermatt 3920, Valais, Switzerland

[22] Filed: Feb. 21, 1975

[21] Appl. No.: 551,738

[30] Foreign Application Priority Data

Feb. 26, 1974 United Kingdom .............. 8576/74

[52] U.S. Cl. ........................................ 75/60; 75/59
[51] Int. Cl.² ......................................... C21C 7/00
[58] Field of Search ................................. 75/59, 60

[56] References Cited

UNITED STATES PATENTS

| | | | |
|---|---|---|---|
| 3,330,645 | 7/1967 | De Moustier | 75/60 |
| 3,867,136 | 2/1975 | Eriksson | 75/59 |

*Primary Examiner*—Peter D. Rosenberg
*Attorney, Agent, or Firm*—William R. Liberman

[57] ABSTRACT

Steel, alloy steel or a ferrous alloy is maufactured in a converter by charging the converter with a metallic feedstock comprising steel, scrap, iron sponge, high grade cast iron or a mixture thereof together with a ferro-alloy and a flux to provide a pool of molten metal. The molten metal is refined by blowing it with a decarburizing feed gas which is reducing to wustite at the temperature at which the converter is operated. A metallic oxide may be added to the converter, the addition being either to the initial metallic feedstock or, preferably continuously, during whole or part of the refining operation. The metallic oxide may be an oxide of a metal which is used as an alloying constituent or additive to a steel, alloy steel or ferrous alloy. Where a metallic oxide is added the blow gas can also be hydrogen or an inert gas such as nitrogen or argon.

40 Claims, 3 Drawing Figures

MANUFACTURE OF ALLOY STEELS AND FERROUS ALLOYS

This invention relates to the manufacture of alloy steels and ferrous alloys.

The difficulties inherent in preparing low carbon alloy steel melts including alloying constituents which are more readily oxidised than iron itself, particularly in the manufacture of chrome alloy steels, are well recognised. Proposals for doing this have been made, for example, the use of the Oxygen-Argon method, and the employment of a blow-gas consisting essentially of hydrogen and water vapour (with the possible addition of argon) in which the oxidant for the carbon and other impurities in the melt is water vapour (U.S. Pat. No. 3,506,436). Both these methods are based on the fundamental thermodynamical data of Chipman, Richardson and others:

$$K_1 = [\%Cr] \cdot (P_{H_2O}/P_{H_2}) \quad \text{Equation 1}$$

and $$K_2 = [\%Cr] \cdot (P_{CO}/a_C) \quad \text{Equation 2}$$

corresponding to the chemical reactions:

$$Cr_3O_4 + 4H_2 = 3Cr + 4H_2O \quad \text{Equation 3}$$

and $$Cr_3O_4 + 4C = 3Cr + 4CO \quad \text{Equation 4}$$

where:
$K_1$ and $K_2$ were equilibrium constants whose values were determined,
[%Cr] is the weight percentage of chromium in the melt,
C applies to carbon dissolved in the molten metal,
$P_{H_2O}$, $P_{H_2}$, $P_{CO}$ respectively are the partial pressures of the constituent gas present in the gaseous phase in equilibrium with the molten metal,
and
$a_C$ is the activity of carbon in the molten alloy.

The Oxygen-Argon method is based on the effect of inert diluent argon, or nitrogen in reducing the partial pressure the carbon monoxide present in the blow-gases in equilibrium with the melt, and is applied commercially with success, but suffers from the high cost of the argon used. This method is based on Equation 2 — the lower the partial pressure of CO, the lower the carbon content.

The method of U.S. Pat. No. 3,506,436, which use a blow-gas consisting essentially of hydrogen and water vapour, is based on the equilibrium established by Equations 1 and 2, but the operating conditions specified are very restrictive:

1. The ratio $H_2O:H_2$ specified for the blow gas is restricted to 0.06 maximum, and preferably to 0.011 to 0.016. These ratios are so low that they would be too close to the equilibrium figure which would be in equilibrium with both the chromium and carbon contents of an 18% chrome alloy melt with maximum 0.1% carbon content to give a sufficient driving force for the melt to be decarburised, at least in a reasonable time.

2. The CO content of the blow-gas is limited to 10% volume maximum, otherwise it is stated that an 18% chrome steel with a carbon content of 0.1% or less cannot be made. This means that the blow-gas cannot be made directly from a hydrocarbon feedstock (methane which has the highest H:C ratio gives a reducing gas with about 35% volume content of CO) so that the gas has to be enriched with expensive hydrogen.

3. The blow-gas consists essentially of $H_2/H_2O$ or $H_2/H_2O/Ar$ mixtures and is thus expensive to produce.

In my British Patent Specification 1,369,595, the use of a controlled blow-gas composition for the manufacture of steel is described, comprising mixtures essentially of $CO/CO_2/H_2/H_2O$ (with or without nitrogen, and traces of other gases) in which the ratio of $H_2O:H_2$ (and the corresponding ratio $CO_2:CO$) is regulated so that it does not exceed that which is "reducing to wustite" i.e. the ratio which is in equilibrium with the system $H_2O/H_2/Fe/FeO$. Under these conditions the impurities, such as carbon, phosphorus, etc. present in the metal charge to the converter can be oxidised without any "gross" formation of wustite or other iron oxide occuring. As described in said Patent Specification this controlled blow-gas composition can be made either by using a superheated gas stream premixed to the desired composition, or by the combustion of a hydrocarbon stream with the appropriate amount of oxygen or air. At the reaction temperature in the converter (normally in the range of 1500° to 1750° C) equilibrium is established almost instantaneously between the gaseous components in accordance with the "shift reaction":

$$CO_2 + H_2 = H_2O + CO \quad \text{Equation 5}$$

and its corresponding equilibrium constant $K_3$:

$$K_3 = (P_{CO} \cdot P_{H_2O})/(P_{CO_2} \cdot P_{H_2}) \quad \text{Equation 6}$$

At, say, 1550° C the value of said $K_3$ is about 4.0, so that the concentration of $H_2O$ in the equilibrium blow gas is higher, and more readily measured, than the $CO_2$ content. Therefore, it is more convenient hereinafter to use the ratio $H_2O:H_2$, defined as the "H ratio", than the smaller corresponding ratio $CO_2:CO$. Thus, the influence of the controlled composition blow-gas on the reactions involved in the metal refining is considered in terms of the "H ratio" at the blow temperature. At the same time both the equilibrium composition (defined by $K_3$) of the blow-gas injected into the converter or reactor (defined as the "decarburising feed gas"), and that the gas leaving the converter (defined as the "decarburising gas")— which will approach the equilibrium values with the melt in the latter case — have to be considered. The composition of the decarburising feed gas changes to that of the decarburising gas as the result of the reaction of the former with the impurities present in the molten metal charged to the converter, notably by the reaction of the oxidants present in the gas ($H_2O/CO_2$) with carbon in the metal melt, for example:

$$C + H_2O = CO + H_2 \quad \text{Equation 7}$$

Thus, for example, the decarburising gas will always contain more CO than the decarburising feed gas, and if the "H ratio" of the former is such that it is "reducing to wustite" then the decarburising gas formed by it will be still more reducing than the decarburising feed gas injected (unless a metal oxide is added to the converter, for example, wustite present in sponge iron charged to it). Thus, if a decarburising feed gas is used which is "reducing to wustite", then for the manufacture of ordinary steels it is certain that the decarburising gas will also be reducing to wustite so that no "gross" formation of wustite can occur during the blow, and the slag content of FeO will not be above the saturation figure.

I find that when this process is applied for the purpose of the manufacture of for example Chrome Alloy steels, or other alloy steels in which some of the alloying elements may be oxidised at a lower oxygen potential than iron, this process can be improved by further adjusting the controlled composition of the blow-gases so as to make them more suitable for the manufacture of such alloy steels for ferrous alloys. If the normal process of my British Patent Specification 1,369,595 is applied, for example, for the manufacture of an 18% chrome alloy steel, and the blow discontinued when the desired carbon percentage is reached, the recovery of metallic iron approaches 100% of the theoretical but the recovery of the more easily oxidisable chromium is only of the order of 96% (Example 1) or lower if the blow is extended beyond this point. The latter recovery is appreciably better than that resulting in the conventional method in which a melt of steel/ferrochrome (high carbon) is blown with oxygen and subsequently "finished" by the addition of ferro-silicon/manganese in order to reduce the chromium degraded to the slag as far as possible to metallic chromium again. The melt obtained after refining the steel/high carbon ferrochrome (Example 1) cound be "finished" in this conventional manner to give an acceptable chrome recovery figure of about 97 – 98%. However, the latter recovery would not be as good as that obtained in the more recent Argon-Oxygen process, and it would be clearly advantageous to increase the chromium recovery if possible to a figure approaching 100%, without the need to "finish" the melt with ferrosilicon.

I find that an improved chromium recovery can be achieved for the process of my British Patent Specification 1,369,595 by taking advantage of the reaction kinetics as well as of the reaction equilibria. For its application to the manufacture of alloy steels, for example chrome steels, we are concerned with the reaction:

$$Cr_3O_4 + 4CO = 3Cr + 4CO_2 \qquad \text{Equation 8}$$

and its equilibrium constant ($K_4$):

$$K_4 = (a_{Cr})^3 (P_{CO_2}/P_{CO}) \qquad \text{Equation 9}$$

where:
$a_{Cr}$ is the activity of Cr in the melt (taking $a_{Cr_3O_4} = 1$) and
$P_{CO_2}$ and $P_{CO}$ are the partial pressures of carbon dioxide and carbon monoxide respectively in the gaseous phase.

Using Equations 6 and 9 in combinatin the latter may more conveniently be written, in terms of the "H ratio":

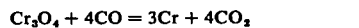
Equation 10 (=Equation 1 & $K_1 = K_5$)

where [%Cr] is weight % Cr in the melt.

Using published thermodynamical data the relationship between the "H ratio" and the weight %Cr in the melt can be expressed graphically as approximate "smoothed" curves for a range of reaction temperatures, $K_5$ varying with the temperature, and this relationship is approximately given in FIG. 1 of the accompanying drawings. It should be noted that although the data are plotted as smooth curves there are, in practice, small breaks at about 9% and 18% Cr, attributed to the type of chromium oxide in the melt.

At the same time there is a similar relationship between the "H ratio" of a chrome steel melt and its equilibrium carbon content:

$$C + H_2O = CO + H_2 \qquad \text{Equation 7}$$

and,

Equation 11

Thus there is a relationship between the equilibrium carbon and chromium contents in a chrome steel melt, cqmbining Equations 10 & 11:

$$(P_{H_2O}/P_{H_2}) = 1/[\%C] \times (P_{CO}/K_6) = K_5/[\%Cr]^{3/4} \qquad \text{Equation 12}$$

From Equation 12 the known relationship between the equilibrium %C and %Cr in a chrome steel melt is obtained:

$$K_7 = ([\%Cr]^{3/4} \times P_{CO})/[\%C] \qquad \text{Equation 13}$$

Figure 2:
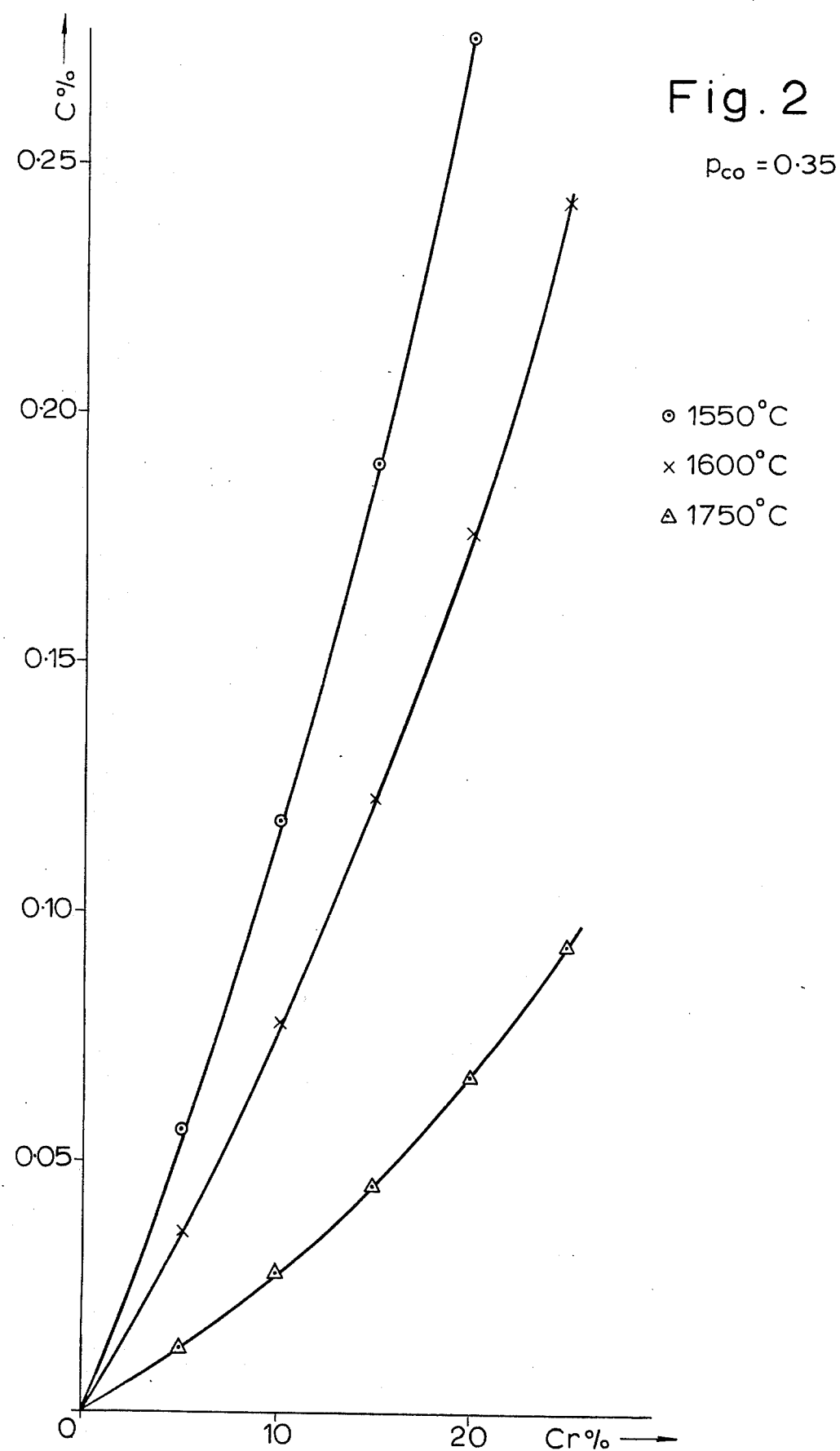

The activity of carbon in a chrome alloy melt varies with the percentage of chromium in it, expressed more conveniently as [%C], and the relationship between [%C] and [%Cr] in the equilibrium melt also varies with the reaction temperature and is expressed graphically for a practical range of temperatures in FIG. 2 of the accompanying drawings in which $P_{CO}$ has been taken as 0.35 corresponding approximately to the blow-gas which could be made directly from methane or natural gas. The %C figures given in FIG. 2 can be converted directly to those corresponding to a different value of $P_{CO}$ by multiplying the %C derived from FIG. 2 by the factor $X/0.35$, where $X =$ the new value of $P_{CO}$. Thus the decarburising gas composition required to give the equilibrium carbon percentage with any chrome alloy of a given %Cr content can be calculated from FIG. 2, coupled with the C:H ratio of the blow gas and Equation 6. For instance, for an 18% Cr steel, using an "H ratio" varying over the range of about 0.03 to 0.085 over the temperature range 1868–2100° K, the chromium/chromium oxide is in equilibrium wth the "H ratio" given by the curves in FIG. 1. For example, at 2100° K the "H ratio" would be 0.085 for 18% Cr in the iron melt. From FIG. 2, for $P_{CO}$ 0.35 and an 18% Cr melt, the equilibrium %C is about 0.04%, and this therefore will be the carbon content in equilibrium with an "H ratio" of 0.085 for an 18% Cr melt at $P_{CO} = 0.35$. The activities of both Cr and C vary somewhat with the presence of other alloying constituents, and the presence of impurities (P, Si, etc.), and for exact calculations can be corrected for this, but normally the correction is small. Impurities present in the melt such as carbon, phosphorus, silicon and the like, which it is desired to refine out of the melt, can only be removed if the "H ratio" for the reaction in question exceeds the equilibrium value for that impurity, so as to give sufficient "driving force" for the reaction to take place at an adequate rate, and the problem exists that when this happens the Cr may also be oxidised. To avoid this latter possibility U.S. Pat. No. 3,506,436 specifies that the "H ratio" must not exceed a figure of 0.06 maximum and preferably should be in the range 0.011 to 0.016, for an 18% Cr melt with 0.1% carbon content.

The present invention provides, according to one aspect, a method for the production of an alloy steel or a ferrous alloy in a converter which comprises charging to the converter a metallic feedstock comprising steel, scrap, iron sponge, high grade cast iron or a mixture thereof, containing minor amounts of non-ferrous elements, together with a ferro-alloy and a flux to provide a pool of molten metal in the converter, refining the molten metal by blowing it with a decarburising feed gas which is reducing to wustite at the temperature at which the converter is operated and tapping alloy steel or ferrous alloy and slag from the converter.

Finishing material (deoxidants and/or alloy components) such as ferrosilicon ferromanganese, or a mixture of these, or aluminum are generally added to the refined melt to adjust the composition to the desired specification. The ferro-alloy can be a high carbon ferro-alloy, such as high carbon ferrochrome.

The decarburising feed gas is usually a mixture of carbon monoxide, carbon dioxide, hydrogen, water vapour and optionally nitrogen or a gas mixture which generate carbon monoxide, carbon dioxide, hydrogen, water vapour and optionally nitrogen in situ in said converter. The decarburising gas preferably contains carbon monoxide in an amount not less than 10% by volume (dry basis) based on the total volume of the decarburising gas. The decarburising feed gas can be produced by burning an hydrocarbon, or mixture of hydrocarbons, in oxygen or air.

The molten metal is generally refined by blowing at a temperature of from 1500 to 1900° C and preferably from 1600° to 1750° C. Preferably the decarburising feed gas has a maximum carbon:hydrogen (atomic) ratio up to 0.8, and more preferably within the range 0.25 to 0.6. Generally the decarburising feed gas as a composition such that the "H ratio" (as herein defined) at the temperature at which the melt is being refined is not greater than 0.45 and preferably lies within the range 0.05 to 0.15.

In a particularly preferred method according to the invention the converter is operated as a closed system, to prevent access atmospheric air to the readily oxidisable alloy steel melt. The off-gas from the converter (decarburising gas) can be recovered using a gastight joint to connect the decarburising gas outlet of the converter to the off-gas conduit, and preferably the gastight joint is cooled by a quench stream. The decarburising gas stream leaving the converter can be quenched, preferably with a hydrocarbon stream, so as to produce a reducing gas by the reaction of the carbon dioxide and water vapour present in the decarburising gas stream by reaction with the hydrocarbons, using the appropriate amount of quench stream to produce the reducing gases at the desired temperature. The reducing gases can be used for the reduction of ores, and the degree of quenching can be controlled so that the gases are made available at a temperature optimum for the reduction of the ore, generally within the range of 700° to 1200° C. This method of operation using a closed system, a quench cooled joint and using the off-gas in a subsequent ore reduction stage is described in more detail in my British Patent 1,369,595 and my U.S. Pat. No. 3,844,770.

The reducing gases can contain an excess of hydrocarbon beyond the stoichiometric amount needed to react with the carbon dioxide and water vapour present in the decarburising gas, the surplus being preferably within the range of 5 to 15% mole of the total reducing gas expressed as the hypothetical hydrocarbon $C_1H_x$ equivalent to average hydrocarbon composition present in the reducing gases.

The molten metal can be refined by blowing it in two stages, the first stage being with a blow gas having a higher oxidising potential than a decarburising feed gas which is reducing to wustite, and the second stage with one that has a lower oxidising potential. The first stage blow gas can be oxygen, air, a decarburising feed gas having an "H ratio" of more than 0.45, or mixtures of these, and the second stage blow gas can be a decarburising feed gas with an "H ratio" less than 0.45 and preferably one with an "H ratio" within the range of 0.05 to b 0.15. The oxygen potential can be progressively reduced from the start of the first stage blow and the end of the second stage blow within the specified limits.

It is an important feature of the invention that the molten metal in the converter is refined with a blow gas comprising CO, $CO_2$, $H_2$ and $H_2O$ which has an "H ratio" as herein defined which is high enough to oxidise impurities such as C, Si and P in the melt but which is not high enough to oxidise alloying constituents present in the melt to a substantial extent in the time required to oxidise the impurities.

Figure 3:
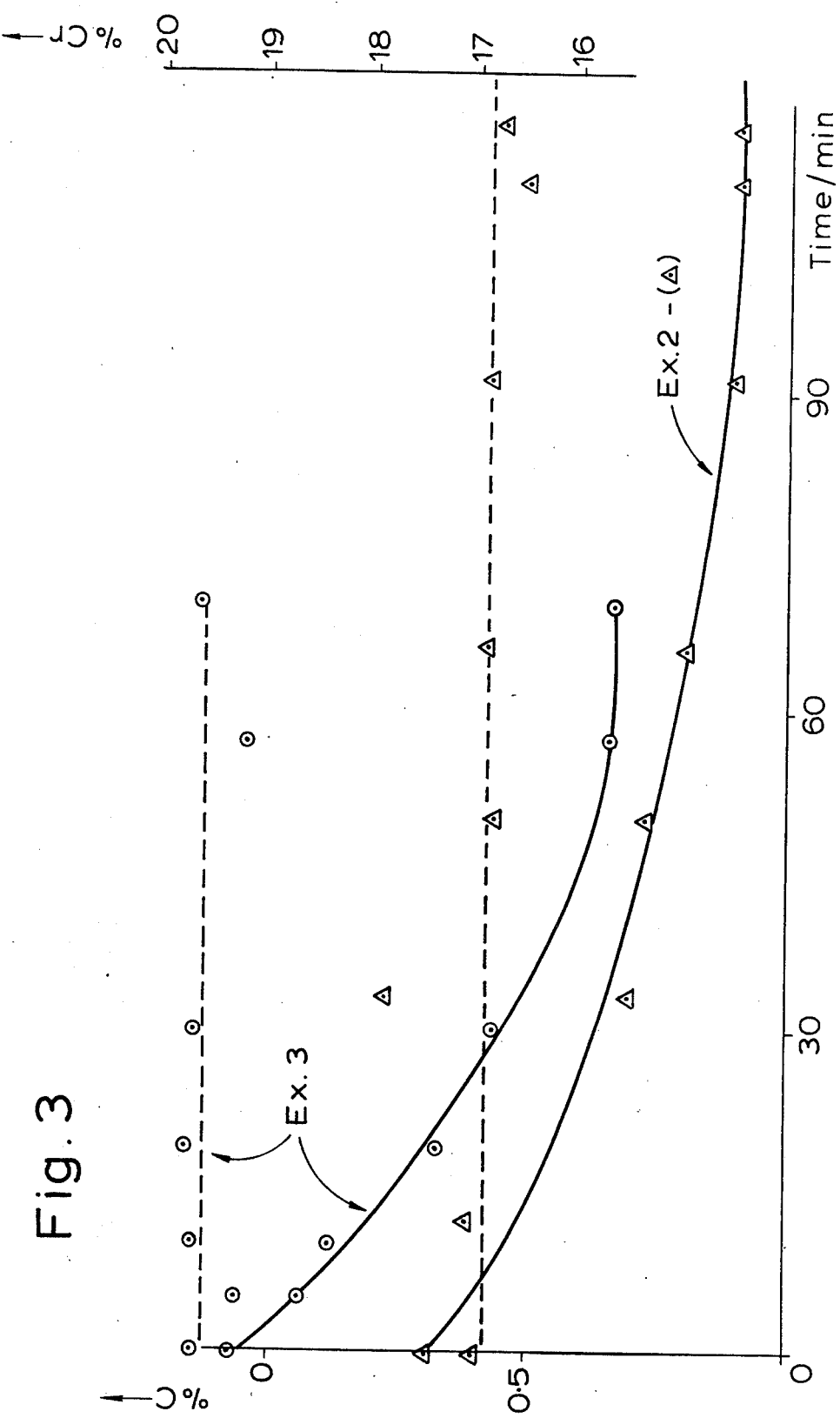

In practice a steelmaking process does not necessarily involve the attainment of complete equilibrium between gas and melt, and I find that by taking advantage of the difference in reaction rates as equilibrium is approached it is possible to use a blow with a considerably higher "H ratio" than is called for by equilibrium conditions and still obtain a high Cr recovery. Thus I find, for an 18% Cr type melt for example, that a product is obtained with a carbon content below 0.1% while still obtaining a chromium recovery approaching 100% (Refer: Example 2). Apparently the rate of reaction for the oxidation of carbon is considerably higher than that of chromium for the controlled operating conditions used, so that the carbon is oxidised preferentially. I find (Example 2), for instance, that for a 17% Cr steel melt blown to an 0.09% C content in 115 minutes blowing time using a controlled decarburising feed gas composition having an "H ratio" of 0.097 (i.e. about 3 times the equilibrium "H ratio") the Cr% of the finished melt was still 16.8% representing a Cr recovery of about 99%. The production of Cr alloy steels can therefore be carried out by this invention by controlling the composition of the decarburising feed gas so at its "H ratio" lies between, say, 0.06 and 0.45, the latter representing the value at which the said gas would become oxidising to iron leading to the "gross" production of wustite. The preferred range of the "H ratio" to be used for the manufacture of alloy steels lies in the range of from say 0.05 to 0.15 which normally gives a sufficiently high oxygen potential for the decarburising feed gases to permit the refining of the alloy steel in a reasonable blow time, while at the same time giving a chromium recovery approaching the theoretical (Refer: FIG. 3), even when the blow time is extended by, say, 10 minutes beyond the point at which the carbon content of the melt has substantially levelled off. At that point the carbon content of the melt approached the theoretical figure calculated from FIG. 2 (corrected for the actual value of $P_{CO}$) as will be seen from the results of some typical runs:

TABLE 1

| Reference | Run Reference | | | | |
|---|---|---|---|---|---|
| | (a) | (b) | (c) | (d) | (e) |
| Type of Steel | 17% Cr | 11% Cr | 19% Cr | 18% Cr | 16/8-Cr/Ni |
| % Carbon, calculated: | 0.17 | 0.11 | 0.18 | 0.25 | 0.07 |
| % Carbon, found: | 0.23 | 0.07 | 0.23 | 0.27 | 0.09 |
| "H ratio" | 0.57/0.036[1] | 0.043 | 0.11 | 0.30 | 0.10 |
| Blow Temperature °C | 1552 | 1577 | 1594 | 1560 | 1600 |
| Partial Pressure of CO: | 0.247[1] | 0.35 | 0.36 | 0.38 | 0.13 |
| % Carbon Calc/% C Found: | 0.74 | 1.57 | 0.78 | 0.93 | 0.78 |

(Note: [1]This was a 2 stage blow with "H ratios" indicated in the 2 halves of the blow)

It will be seen that no difficulty was encountered in making low carbon chrome alloy steels, and from the data given in FIG. 2 it can be seen that lower carbon figures still could have been obtained by raising the melt temperature to the range 1650° to 1750° C or higher, and that at a higher temperature it is possible to use a higher value of $P_{CO}$ in order to obtain a chrome alloy steel with a carbon content lower than 0.1%. For very low carbon steels I find that the last part of the melt blow can be carried out using a decarburising feed gas prepared by using air instead of oxygen, so that the $P_{CO}$ value of the gas is reduced by the presence of the nitrogen, with a favourable effect on the terminal carbon content of the melt. Alternatively, or additionally, the melt can be finished by vacuum degassing in the customary manner with its consequential beneficial effect on the carbon content, as well as the oxygen content of the finished melt.

The invention also provides a method for the production of steel, an alloy steel or a ferrous alloy in a converter which comprises charging to the converter a metallic feedstock comprising steel, scrap, iron sponge, high grade cast iron or a mixture thereof, containing minor amounts of non-ferrous elements, together with a ferro-alloy and a flux to provide a pool of molten metal in the converter, refining the molten metal with addition of a metallic oxide to the converter, the addition being either to the initial metallic feedstock charged to the converter (in which case the metallic oxide is other than iron oxide) or during whole or part of the refining operation the molten metal being refined by blowing it with a decarburising feed gas which is reducing to wustite at the temperature at which the converter is operated, or with hydrogen, an inert gas or a mixture thereof, and tapping steel, alloy steel or ferrous alloy and slag from the converter.

The metallic oxide or mixture of metallic oxides which is preferably added continuously during the course of the refining operation may be added in the form of an oxidic ore, a roasted ore or a concentrate thereof or as the metallic oxide itself. The metallic oxide or ore is generally one containing the oxide or oxides of one or more of the group of metals used as alloying constituents or additives to a steel, alloy steel or ferrous alloy, such as for instance iron (as wustite), chromium, nickel, tungsten, molybdenum, titanium, niobium, copper and other such customary steel constituents.

The amount of metallic oxide added is preferably greater than the stoichiometric quantity needed to react with the carbon in the pool of molten metal, and more preferably the excess of metallic oxide is sufficient to produce a content of it in the slag which saturates it or substantially saturates it thus facilitating the production of a low carbon content in the melt. The decarburising feed gas may have an "H ratio" which is reducing to the metallic oxide when it is desired to increase the percentage of the resultant alloy constituent in the molten metal pool, or vice-versa may have an "H ratio" which is oxidising to the metal of the metallic oxide when it is desired to reduce the percentage in the molten metal. The carbon content of the initial pool of molten metal can be controlled so that it results in the production of the desired percentage of the metal produced from the metallic oxide in the steel, this carbon content being controlled by the percentage of higher carbon content metal feedstocks charged to the converter such as high carbon ferro-alloy or higher cast iron, and/or by the addition of carbon or carbonaceous matter to the said metallic oxide added to the converter.

One or more of the metallic oxides or mixtures of them may be in the form of a partly reduced iron sponge produced by the direct reduction of an iron ore or an iron ore containing the metallic oxide or oxides, for example a titaniferrous iron sand or a concentrate thereof. The iron sponge produced by partial reduction of the iron ore or iron sand has a percentage reduction preferably within the range of 60 to 98% reduction measured as the percentage of oxygen combined with iron which has been removed from the ore on its reduction.

In this case also it is possible to refine the melt with a decarburising gas using a two-stage blow as described above.

Another important aspect of the invention is thus the production of steel, an alloy steel or a ferrous alloy by refining molten metal in a converter with super-heated blow-gases, a metallic oxide being added to the melt initially and/or during part of the blowing operation.

According to this aspect of the invention I also find that a further improvement in the manufacture of alloy steels can be effected by adding a predetermined amount of metallic oxide to the melt, means being provided to feed it into the melt continuously (and preferably at substantially a constant rate) during the course of the blowing operation or during a substantial part thereof. The oxygen present in said metallic oxide supplements the oxygen potential of the blow gas, or decarburising feed gas, used for the purpose of oxidising the carbon and other impurities present in the melt the metallic oxide being reduced simultaneously to the metal which is retained in the melt. For example, in the case of the oxide $M_xO_y$ of metal M:

$$M_xO_y + yC = xM + yCO \qquad \text{Equation 14}$$

It is probable that the metallic oxide acts as an autocatalyst, thus for Equation 14 the metal M can react with, for example, carbon dioxide or water vapour (and/or when the metallic oxide added is other than an iron oxide, with wustite) regenerating the oxide $M_xO_y$, the reaction cycle then being repeated indefinitely. The decarburisation is facilitated when a surplus of metallic oxide is used above that required stoichiometrically, so that the slag approaches saturation with it and its activity also accordingly approaches 1.0. The metal (M) formed by reaction of the carbon with the metallic oxide remains in the alloy steel produced, and by choosing a suitable metallic oxide (for example, $TiO_2$) this can be beneficial to the properties of the steel produced.

The carbon required for this reaction can be derived from that already present in the alloy melt being refined, for example being derived from added high carbon ferrochrome, and/or high grade cast iron included in the initial melt, or it can be mixed as carbon or carbonaceous matter with the metallic oxide added, as hereinafter described.

This reaction is governed by the thermodynamical relationship between the contents (activities) of the carbon and metal M contents of the melt in question. For example, for $TiO_2$ as the metallic oxide, with a slag saturated with it, the following relationship exists:

$$[a_C] = P_{CO} \times [a_{Ti}]^{1/2} \times ([K_{Ti}]^{1/2}/K_{C-o}) \qquad \text{Equation 15}$$

where:
$(a_{TiO_2}) = 1.0$ for a saturated slag and is omitted.
$[a_{Ti}]$ = the activity of Ti in the equilibrium metallic melt
$[a_C]$ = the activity of C in the equilibrium metallic melt
$P_{CO}$ = the partial pressure of CO in the decarburising gas
$K_{Ti}$ = Equilibrium Constant for the reaction: $Ti_{(wt\%)} + 2O_{(wt\%)} = TiO_2$
and
$K_{C-o}$ / Equilibrium Constant for the reaction: $C_{(wt\%)} + O_{(wt\%)} = CO_{(g)}$ From Equation 15 the content of Ti in equilibrium with a given carbon percentage in the refined melt can be roughly calculated, bearing in mind the uncertainties for the thermodynamical data used for the reactions, oxide composition and activity and interaction coefficients involved, and the predetermined amount of metallic oxide to be used can be estimated. If this predetermined amount of metallic oxide is fixed in excess of that required to produce the said equilibrium content Ti in the melt, then the melt will be effectively decarburised to a low carbon content (Example 6), particularly if the reaction is carried out at a high temperature (say, 1700°–1850° C) as the decarburisation reaction is favoured because said Equilibrium Constants $K_{Ti}$, $K_{C-o}$ are favourably influenced by an increase in temperature. In the extreme case such effective decarburisation can be achieved without the simultaneous use of any blow gas containing an "oxidant", as the metallic oxide acts as the oxidant for the purpose, the surplus remaining in the slag. Thus decarburisation can be effected under these conditions if infiltration of air is avoided, and preferably if an inert gas atmosphere, such as argon, nitrogen, hydrogen or mixtures of these, is maintained in the converter to this end. However, to ensure that no gross oxidation of the metallic melt occurs it is convenient to blow the melt, for example a chrome alloy steel melt containing such added metallic oxide, with a small amount at least of decarburising feed gas having a low "H ratio". I find that when a chrome alloy steel melt consisting of molten steel with added high carbon ferrochrome is refined by using a metallic oxide as the oxidant, as described above, the melt is efficiently decarburised without the chromium content of the melt being appreciably affected (Example 6), provided that the metallic oxide used as an oxidant is a suitable one with standard free energy of formation appreciably greater than that of chromium oxide at the refining temperature, i.e., which lies well below the curve for chromium oxide (as a function of temperature) in the well known Ellingham Diagrams. Such suitable metallic oxides are, for example, those of Titanium Molybdenum and other elements of Period IV, V and VI of the Periodic Table as described below. Iron oxides can also be used as the metallic oxide in conjunction with decarburising feed gas "reducing to wustite", preferably in the form of iron sponge still containing some unreduced wustice, and in that case (Example 4) decarburisation proceeds efficiently while a reasonable Cr recovery (94.3%) is obtained, which can be improved to a satisfactory level by the customary method of using a deoxidant such as ferrosilicon to reduce the chromium oxide content of the slag. It is possible that the reaction rate of decarburisation, when using wustite as a supplementary oxidant to the decarburising feed gas, is greater than that of the oxidation of chromium to oxide, so that the carbon is preferentially removed.

The use of an oxide to assist in the decarburisation of a steel melt is not novel, for example haematic additions (known as "oreing") in one or more batches having been used for many years in the Open Hearth process to speed up the reaction rate and to improve operating conditions by initiating an active "carbon boil". However, the novelty of the present proposal lies in the use of metallic oxides other than iron oxides, and also preferably in the continuous addition of the metallic oxides (including the oxides of iron) simultaneously with blowing by a decarburising feed gas reducing wustite, as described in my British Patent Specification 1,369,595, so that the iron oxide content of the slag is kept low, and in the generation of heat by the partial combustion of hydrocarbons within the converter, thus reducing the thermal load on the electric furnace in which the alloy steel is made.

The continuous addition of the metallic oxide, made either as such or in the form of a reduced metal still containing some oxide such as iron sponge, overcomes the problem encountered in the Open Hearth process when using "oreing" that the oxide goes massively into the slag increasing its iron oxide content and consequently its attack on refractory linings, and adding to the bulk of the slag blaketing the bath. In the said alternative combination using continuous oxide addition together with superheated blow-gases the latter may consist of any gas or mixture of gases including oxygen having an oxygen potential capable of oxidising the impurities present in the molten metal to the desired degree. Preferably said superheated blow-gas may be a decarburising feed gas consisting essentially of mixtures of $CO/CO_2/H_2/H_2O$, together with nitrogen if desired, prepared as described in, my British Patent Specification 1,369,595 which has a controlled composition such that it is "reducing to wustite". When manufacturing an alloy steel, such as chrome steels, chrome/nickel alloy steels, and other alloy steels or ferrous alloys, the "H ratio" of the decarburising feed gas is preferably held between the limits of 0.04 to 0.45 when manufacturing such alloy steels which contain an alloy constituent, for example chromium as discussed above, which is more easily oxidised in the melt than is metallic iron.

The metallic oxide is added in this manner can consist of either any oxide or mixture of oxides as such corresponding to any metallic alloying component of the final alloy steel produced, or of a mixture of said oxide or oxides with carbon or carbonaceous matter. As stated the oxide can also be in the form of a partly reduced metallic oxide, for example sponge iron from the direct reduction of iron ore; and the carbonaceous matter if used can consist of coke, coal, graphite, sawdust, and/or of a heavy petroleum product such as fuel oil, bitumen or tar which can be used as a binder for the oxide and the carbonaceous matter. The said metallic oxide, or mixture of oxides, with or without the addition of carbonaceous matter, is preferably added to the converter in the form of a pellet or briquette for ease of addition without "dusting". Preferably the addition of carbonaceous matter is utilised with it being uniformly distributed throughout the pelleted or briquetted material, and with the predetermined amount of oxide being fixed so that the desired quantity of alloy constituent, or constituents, derived from it will yield an alloy steel of the desired composition. This has the advantage that each particle added to the melt contains the oxide and carbonaceous matter in intimate contact, and adequate quantity, so that it is substantially reduced to the metal as it melts on falling into the molten bath, thus reducing the amount of valuable alloy constituent lost into the slag. A lower than stoichiometric amount of carbonaceous matter can be utilised, particularly when the molten metal to which it is added has a relatively high carbon content at the start of the blow. As stated above, when using this method of continuous oxide addition for the manufacture of alloy steels, the "H ratio" used for the decarburising feed gas may normally lie within the range of 0.04 to 0.45, the lower limit being taken somewhat lower than the figure used without oxide addition because the oxygen potential of the blow-gas is supplemented by that of the oxide added. A figure even lower than 0.04 can be used for said lower limit, particularly when the oxide addition is substantial, the use of a more reducing blow-gas (i.e., with a lower oxygen potential) helping to keep down the oxide content taken up by the slag and thus wasted.

The processing of alloy steel melts in the manner proposed, with or without the continuous addition of metallic oxide, can be carried out in any type of converter capable of being equipped with means for charging and discharging the converter with molten metal (and flux/slag), and for introducing the superheated controlled composition decarburising feed gas (for example a lance of oxy-fuel burner). Preferably a converter is used which can be operated as a closed system, being equipped with a gastight joint so that the blow gas make from the converter can be recovered and used either for the direct reduction of ore, as fuel, or for any other suitable purpose (instead of being vented to the air), as described in my British Patent Specification 1,369595. In this manner fuel economy is achieved and atmospheric pollution is avoided. The converter can be an electric furnace, utilising conventional available equipment, employing electric power to supplement the heat requirements of refining the charge, but normally sufficient heat is supplied by the superheated decarburising feed gases to meet these requirements, notably the effect of the endothermic decarburisation reactions, and the heat losses from the equipment. In order to reduce the heat losses it is advantageous for the converter to have a double lining of refractories, the outer shell having a refractory of high insulating power and the ner shell being constructed of the normal magnesite brick/rammed lining or equivalent, with means being rovided to protect the more fragile outer shell from the stresses involved in operation. Such a double lining of special design is not essential and the normal converter lining used, for example, for the BOS converter can be used.

The method of preparing the metallic charge to the converter is in line with normal practice for the manufacture of alloy steels. For example, the converter can be charged with molten refined steel which can have been prepared, say, by melting scrap in an electric furnace together with the calculated amount of ferrochrome, which can be high carbon ferrochrome. Alternatively, the molten charge of steel can have been prepared in the conventional manner (or as described in my British Patent Specification 1,369,595) by refining the metal in the presence of a flux, and removing the slag, either in an electric furnace, or in a converter which can be the same converter used for blowing the melt, containing added ferrochrome to produce the chrome steel using a controlled composition decarburising feed gas as described above. The refined steel/ferrochrome melt (containing also the calculated amount of flux) is maintained at the desired blowing temperature range, normally within the limits of 1,500° to 1,850° C, and preferably around 1,600°–1650° C, higher temperatures within these limits being employed where appropriate for the production of high chromium and/or low carbon content alloy as described above. Said controlled composition decarburising feed gas used for the blowing of the chrome alloy melt is prepared by one of the methods described in my British Patent Specification 1,369,595 and its composition is controlled so that it is "reducing to wustite" and normally has an "H ratio" within the range of 0.06 to 0.45, as described above. If continuous oxide addition during part of the blow is used, as discussed above, means are provided for such addition, and the lower limit of the "H ratio" employed can be 0.04 or even lower as described. The blow with said decarburising feed gas is continued until the desired carbon content is reached, when the blow is stopped and the small amount of slag removed. The alloy steel melt can then be finished in the customary manner, for example, by vacuum degassing or "purging" with an inert gas, followed by the addition of "finishings" for deoxidation and to adjust the alloy to the final specification. If necessary, the chrome content of the slag can be reduced by adding ferrosilicon and/or ferromanganese in the customary manner, before the slag is removed. Normally, however, this is not necessary as when using the controlled decarburising feed gas composition specified for this invention the recovery of chromium can approach the theoretical, and little or no "gross" formation of chrome oxide takes place unless the optimum conditions are exceeded.

As will be appreciated by those skilled in the art the methods claimed and described for this invention, and illustrated by the subsequent Examples, for the preparation of ferrous alloys and alloy steels of the chromium and chrome-nickel type, can be equally applied to the manufacture of other alloys. In particular to those alloys containing metallic elements of Period IV of the Periodic Table, such as Titanium, Vanadium and Cobalt as well as chromium manganese and nickel; as well as those of Period V such as Niobium and Molybdenum, and of Period VI such as Tungsten which are customarily used in alloy steel as alloying elements or additives. Naturally, for the more easily oxidisable elements such as Vanadium, the "H ratio" can be set at a lower figure within the specified bracket of 0.06–0.45 at gaseous equilibrium for the blowing temperature, so that the melt is refined at a lower oxygen potential and the Vanadium is protected from gross oxidation. When one of the oxides of such metals is used in the decarburising of a steel melt, the metal formed, as described above for Equation 14, remains in the finished steel, usually as small percentage (Example 6). The excess of said metallic oxide employed remains behind as such in the slag, and if a higher percentage of said metallic element is required in the finished alloy steel, this can be achieved by one or more of the following alternatives: either by adding more carbon to the melt to increase the amount of oxide reduced to metal, or by adjusting the "H ratio" of the decarburising feed gas (when used) to make it more reducing, or by "finishing" the melt by the addition of a deoxidant (such as ferrosilicon or ferromanganese) in the customary manner so as to reduce the said metallic oxide remaining in the slag to give the desired percentage of said metal in the final alloy steel. Titanium oxide is particularly apt for use as said metallic oxide, as it is very efficient in promoting the decarburisation reaction (Example 6). It is preferably used in the form of an iron sponge produced by the reaction of Titaniferrous iron sands (or "prefluxed" ore sands) as such feedstock is cheap and plentiful. The iron sponge from said feedstock comprises mainly reduced iron together with titanium oxide and some wustite, together with flux — if used — and slag derived from it, and the amount to be added to the steel melt is calculated from the titanium oxide content. The presence of a small amount of titanium in the finished steel is in general beneficial.

The decarburising feed gas used in the converter for oxidising the carbon and refining the melt, can (as described in my British Patent Specification 1,369,595) be either a mixture of gases "reducing to wustite" within the specified "H ratio" bracket which includes all or part of the components $CO/CO_2/H_2O/N_2$ (the latter in the case that air is used in the preparation of said decarburising feed gas compartments) and preferably highly superheated, or alternatively it can be prepared in place in the converter by combustion. In the latter case an oxy-fuel burner can be used for the purpose, in which the ratio of hydrocarbon fuel and/or hydrogen containing gas to the oxygen or air used for its partial combustion is controlled to give said decarburising feed gas of the desired composition. The control of the degree of mixing of the fuel gas and oxygen or air in the flame from said oxy-fuel burner, which impinges on the molten metal surface, can be of importance as it affects the reaction kinetics. Care must be taken that there is an adequate degree of mixing of the flame components so that preferential oxidation of the metal by free oxygen, rather than that of the fuel component, does not occur because of inadequate mixing.

Preferably a hydrocarbon fraction with a high hydrogen to carbon ratio is employed for the preparation of the decarburising feed gas, such as methane or naphtha/tops, as the higher hydrogen content has a most beneficial effect on the rate of decarburisation and the achievement of a low carbon content steel from the blow as discussed (FIG. 2 and Equations 11 and 13), because the higher hydrogen content of the blow gases reduces the value of $P_{CO}$. The composition of said decarburising feed gas can be varied during the blow to suit the operating conditions and desired steel specification. For example, a higher "H ratio" can be used at the start of a blow, when maximum heat input is required to melt the ferrochrome and/or other alloy additions, and can be tolerated when the carbon content of the melt is high at the start of the blow. Later, the "H ratio" can be reduced to a figure nearer to the equilibrium value for the desired C% specification, in order to avoid or minimise a build up of Cr in the slag. Again, if it is desired to manufacture a low C% alloy, without having to employ a high converter blowing temperature, it may be attractive to blow the melt with a decarburising feed gas prepared from a hydrocarbon having a high H:C ratio (such as methane-natural gas) and oxygen, which will readily yield a carbon content of 0.2 to 0.3% when blowing at 1550°–1600° C (for instance, Example 3), and then replace the oxygen used in the preparation of the blow gas by air (or, to use added nitrogen), so that the presence of the nitrogen reduces the partial pressure of the carbon monoxide in the decarburising feed gas to about half. This lower $P_{CO}$ has the effect of also reducing the carbon content to about half the previous figure of 0.2 to 0.3%, and if the blow temperature is increased to, say 1650° C it is then possible in this manner to make an 18% chrome steel having a 0.1 carbon content. If the presence of nitrogen in the steel is undesirable, the composition of the decarburising feed gas can be changed back to that used at the start of the blow (made from oxygen, and nitrogen free) for a few minutes at the end of the blow in order to purge the nitrogen from the melt, or other known methods used to reduce the nitrogen. The manufacture of lower chromium content alloy steels by the methods of this invention is far easier than the higher chrome alloys, for example chrome or chrome nickel alloys having around 18% or 11% Cr content, as a decarburising gas having a higher "H ratio" can be used (refer FIG. 1) within the bracket 0.06 to 0.45 without risk of a low chromium recovery being experienced, for example for 4–6% Cr steels or lower.

Other alternative permutations and combinations of these variations in the application of this invention can be used, as will be clear to one skilled in the art.

The following Examples illustrate the invention:

EXAMPLE 1

Manufacture of a 19% chrome alloy steel with carbon content 0.27%, using an "H ratio" of 0.301.

EXAMPLE 2

Manufacture of a 17/8% chrome-nickel alloy steel with carbon content 0.09% using an "H ratio" of 0.097.

EXAMPLE 3

Manufacture of 19–20% chrome alloy steel with carbon content 0.33% using an "H ratio" of 0.125.

EXAMPLE 4

Manufacture of a 17/8% chrome-nickel alloy steel with carbon content 0.09%, using an "H ratio" of 0.013 for the first part of the blow with simultaneous continuous addition of 16.06 grams of 70% reduced iron sponge containing 11.2 grams of iron over a period of 28 minutes, and finishing the blow with an "H ratio" of 0.101 in the second part of the blow.

EXAMPLE 5

Manufacture of an 19/8% chrome-nickel alloy steel stabilised with molybdenum (2.6%) with carbon content 0.12%, adding 4.5% wt. on metal charge to the converter of molybdenum trioxide, and employing an "H ratio" of 0.104 at 1700° C.

EXAMPLE 6

Manufacture of an 18/8% chrome-nickel alloy steel stabilised with titanium (0.13%) with carbon content 0.1%, adding 1% on metal charge to the converter of titanium dioxide, and employing an "H ratio" of 0.131 at 1620° C.

These experimental Examples were carried out in a laboratory converter, simulating an electric steel furnace, which was equipped with an insulated cover with openings for the introduction of the decarburising feed gas lance, and iron sponge (when added), and for the removal of the blow gas. The converter was heated by an electric induction furnace to compensate for the heavy heat loss from small scale laboratory equipment and maintain the desired blow temperature. The decarburising blow gas was made up of gas components to give the controlled composition at equilibrium of the gas mixture indicated for the respective Examples. The converter was charged with a suitable mixture of metals, (and metallic oxides, when used) and flux, as indicated below, to simulate the blowing of a blend of refined steel/scrap with high carbon ferrochrome, and the charge melted in a non-oxidising atmosphere to the desired blow temperature before the blow with the decarburising feed gas was commenced:

| Experimental Results: | Example 1 | Example 2 | Example 3 | Example 4 | |
|---|---|---|---|---|---|
| Initial melt - Wt % | | | | | |
| (balance Fe/Mn) | | | | | |
| Chromium % | 19.29 | 17.0 | 19.52 | 18.03 | |
| Nickel % | — | 8.0 | — | 8.7S | |
| Carbon % | 0.69 | 0.69 | 1.07 | 1.14 | |
| Phosphorus % | 0.04 | 0.04 | 0.04 | 0.04 | |
| Silicon % | 0.24 | 0.24 | 0.24 | 0.24 | |
| Melt Weight - grams | 98.95 | 98.95 | 99.30 | 111.5 | |
| Flux: Lime-grams | 2.0 | 2.0 | 2.0 | 2.0 | |
| Magnesium oxide-grams | 1.0 | 1.0 | 1.0 | 1.0 | |
| Decarburising Feed Gas: | | | | | |
| (Equilibrium Mole Proportion) | | | | Blow 1 | Blow 2 |
| Hydrogen mole | 0.6149 | 0.7901 | 0.5363 | 0.7377 | 0.7103 |
| Water Vapour mole | 0.1852 | 0.0763 | 0.0671 | 0.0092 | 0.0718 |
| Carbon Monoxide mole | 0.1852 | 0.1302 | 0.3837 | 0.2525 | 0.2121 |
| Carbon Dioxide mole | 0.0147 | 0.0034 | 0.0129 | 0.0008 | 0.0058 |
| "H ratio" ($H_2O:H_2$) | 0.301 | 0.097 | 0.125 | 0.0125 | 0.101 |
| H:C Ratio (atoms) | 8.01 | 13.0 | 3.04 | 5.9 | 7.18 |
| Rate of Injection mol/hr. | 1.486 | 1.390 | 1.960 | 1.620 | 1.547 |
| Blow tme - minutes | 61 | 115 | 70 | 47 | 79 |
| Temperature ° C | 1560 | 1600 | 1590 | 1680 | final |
| Yield of Alloy: | Example 1 | Example 2 | Example 3 | Example 4 | |
| Metal Recovery, grams | 96.8 | 98.1 | 98.2 | 111.4 | |
| Metal Recovery, Wt.% | 97.9 | 99.2 | 98.9 | 99.9 | |
| Intermediate Analyses: | | | | | |
| After blow time, minutes | 54 | 91 | 57 | — | |
| Carbon content Wt.% | 0.27 | 0.09 | 0.33 | — | |
| Chromium content Wt.% | 19.0 | 16.9 | — | — | |
| Chromium recovery % | 96.4 | 99.2 | — | — | |
| Final Alloy Analyses: | | | | | |
| Carbon content Wt.% | 0.27 | 0.09 | 0.33 | 0.09 | |
| Chromium content Wt.% | 17.1 | 16.8 | 19.7 | 17.0 | |
| Chromium recovery Wt.% | 88.3 | 98.6 | 99.3 | 94.3 | |
| Phosphorus content Wt.% | nil or neg. | nil or neg. | nil or neg. | nil or neg. | |
| Silicon content Wt.% | — | — | 0.14 | 0.075 | |
| Slag Analyses: | | | | | |
| Fe content Wt.% | 0.74 | — | 4.25 | 1.24 | |
| Cr content Wt.% | 4.07 | — | 1.65 | 1.04 | |

It will be noted that the intermediate melt analyses showed, for Examples 1, 2 and 3 substantially the same carbon analyses as at the end of the blow, respectively 7, 24 and 13 minutes before the end of the blow (ref: FIG. 3). In practice the blow would have been stopped at that point, and it will be seen that for Example 1 the chromium recovery would then have been 96.4%, although it fell to 88.3% at the end of the blow because of the high "H ratio" (0.301) used for this run.

The production of alloy steels of the 11% Cr type by the methods of this invention was considerably easier than those of the 18% Cr and 18/8% chrome-nickel type covered by Examples 1 to 4. No difficulty was experienced in producing 11% Cr steels with carbon contents in the region of 0.05%, when blowing the melt at 1550° to 1600° C, in similar experimental runs.

EXAMPLE 5

This experimental 300 gram batch showed a Cr recovery of 99.5% and a carbon content of 0.12%, which remained unchanged from completion of the melt until the end of the blow period of 2 hours using a decarburising feed gas (1.93 gram moles/hr.) having an "H ratio" of 0.104 and a $P_{CO}$ of 0.254 with an H:C ratio 5.7

(atomic). During the same period the Mo content fell from 2.6% to 2.4%. Ni recovery was 100%.

EXAMPLE 6

This experimental 400 gram batch showed Cr and Ni recoveries of 90% to 100%, respectively, and a carbon content of 0.08% at the completion of the blow, with a Ti content of less than 0.005%. The blow period was for 66 minutes, and the carbon content at the start of the blow was 0.1% with a Ti content of 0.13%. Thus an 0.1% alloy steel carbon content was achieved before the start of the blow, with 0.13% Ti content and 100% recovery of Cr. and Ni.

In all these runs (Examples 1–6) the crucibles, as would be expected by the low metallic oxide contents of the slags, were in good condition indicating very slight attack of the refractory lining on the large scale.

I claim:

1. A method for the production of a ferrous alloy in a converter comprising the steps of:
   i. charging to said converter a metallic feedstock selected from the group consisting of steel, scrap, iron sponge and high grade cast iron, and mixtures thereof, containing minor amounts of non-ferrous elements, together with a ferro-alloy to provide a pool of molten metal in said converter;
   ii. refining said molten metal by blowing with a decarburizing feed gas which is reducing to wustite at the temperature at which said converter is operated and which comprises a mixture of gases selected from the group consisting of mixtures comprising carbon monoxide, carbon dioxide, hydrogen and water vapor and gas mixtures which generate carbon monoxide, carbon dioxide, hydrogen and water vapor in situ in said converter; and
   iii. tapping ferrous alloy and slag from said converter.

2. Method according to claim 1 in which a finishing material is added to said refined melt.

3. Method according to claim 1 in which said finishing material is ferrosilicon, ferromanganese, or a mixture of these, or aluminum.

4. Method according to claim 1 in which said ferro-alloy is high carbon ferrochrome.

5. Method according to claim 1, in which said decarburising gas contains carbon monoxide in an amount of not less than 10% by volume (dry basis) based on the total volume of said decarburising gas.

6. Method according to claim 1, in which said decarburising feed gas is produced by burning a hydrocarbon, or mixture of hydrocarbons, in oxygen or air.

7. Method according to claim 1, in which said molten metal is refined by blowing at a temperature of from 1500° to 1900° C.

8. Method according to claim 1, in which said decarburising feed gas has a composition such that the "H ratio" at the temperature at which the melt is being refined is not greater than 0.45.

9. The method according to claim 1, in which the decarburizing feed gas has a carbon: hydrogen (atomic) ratio of up to 0.8.

10. The method, according to claim 9, in which the carbon: hydrogen (atomic) ratio is in the range of from 0.25 to 0.6.

11. Method according to claim 8 in which said "H ratio" is in the range from 0.05 to 0.15.

12. Method according to claim 1, in which said converter is operated as a closed system to prevent access of atmospheric air to said melt.

13. Method according to claim 12, in which off-gas from said converter (decarburising gas) is recovered using a gastight joint to connect an outlet from said converter for decarburising gas to an off-gas conduit.

14. Method according to claim 13 in which said gas tight joint is cooled by a quench stream.

15. Method according to claim 14, in which said decarburising gas stream leaving said converter is quenched by a hydrocarbon stream to produce a reducing gas by reaction of carbon dioxide and water vapour present in said decarburising gas stream with said hydrocarbons.

16. Method according to claim 15, in which said reducing gases are subsequently used for reduction of ore and the degree of quenching is controlled so that said gases are provided at a temperature optimum for the reduction of the ore within the range of 700° to 1200° C.

17. Method according to claim 1, in which said reducing gases contain an excess of hydrocarbon beyond the stoichiometric amount needed to react with carbon dioxide and water vapour present in said decarburising gas.

18. Method according to claim 17 in which said excess is in the range of 5 to 15% mole of the total reducing gas expressed as the hypothetical hydrocarbon $C_1H_x$ equivalent to the average hydrocarbon composition present in said reducing gases.

19. The method, according to claim 1, comprising, in addition, an initial blowing stage, carried out intermediate steps (i) and (ii), the initial blowing being carried out with an initial blowing gas which is not reducing to wustite, the initial blowing gas being selected from the group consisting of oxygen, air, a decarburizing feed gas having a "H ratio" of greater than 0.45, and mixtures thereof.

20. The method according to claim 19, in which the oxidizing potential of the blowing gas is progressively reduced between the start of the initial blowing stage and final completion of blowing in step (ii), the "H ratio" during the blowing in step (ii) of the decarburizing feed gas being less than 0.45.

21. The method in accordance with claim 1, wherein the decarburizing feed gas comprises in addition nitrogen.

22. A method for the production of a ferrous alloy in a converter, the method comprising the steps of:
   i. charging to the converter a metallic feedstock selected from the group consisting of steel, scrap, iron sponge and high grade cast iron, and mixtures thereof, containing minor amounts of non-ferrous elements, together with a ferro-alloy to provide a pool of molten metal in said converter;
   ii. refining the molten metal by charging a metallic oxide to the converter and blowing with a primary decarburizing feed gas reducing to wustite at the temperature at which said converter is operated and which is selected from the group consisting of mixtures comprising carbon monoxide, carbon dioxide, hydrogen and water vapor and gas mixtures that generate carbon monoxide, carbon dioxide, hydrogen and water vapor in situ in said converter, hydrogen, gases inert to the molten metal and mixtures thereof; and
   iii. tapping ferrous alloy and slag from the converter.

23. The method according to claim 22, wherein the metallic oxide is charged to the converter together with the metallic feedstock and wherein the metallic oxide is other than iron oxide.

24. The method of claim 22, wherein the metallic oxide is added to the converter during the blowing operation.

25. Method according to claim 22 in which a finishing material is added to said refined melt.

26. Method according to claim 25 in which said finishing material is ferrosilicon, ferromanganese, or a mixture of these, or aluminum.

27. Method according to claim 22 in which said metallic oxide is added continuously during said refining.

28. Method acording to claim 22 in which said ferroalloy is high carbon ferrochrome.

29. Method according to claim 22, in which said metallic oxide or mixtures of metallic oxides is added in the form of an oxidic ore, a roasted ore or a concentrates thereof or as the metallic oxide itself.

30. Method according to claim 29 wherein said metallic oxide is an oxide of one or more of the group of metals used as alloying constituents or additives to a steel, alloy steel or ferrous alloy.

31. Method according to claim 30 wherein said metallic oxide is an oxide of iron (as wustite), chromium, nickel, tungsten, molybdenum, titanium, niobium or copper.

32. Method according to claim 22, said metallic oxide is added in excess of the stoichiometric quantity needed to react with the carbon in said molten metal.

33. Method according to claim 32 in which said excess of metallic oxide is sufficient to produce a content of said metallic oxide in said slag which saturates or substantially saturates said slag.

34. Method according to claim 22 in which decarburising feed gas has an "H ratio" which is reducing to said metallic oxide.

35. Method according to claim 22 in which said decarburising feed gas has an "H ratio" which is oxidising to the metal A said metallic oxide.

36. Method according to claim 29 in which at least one of said metallic oxides is in the form of a partly reduced iron sponge produced by direct reduction of an iron ore or iron ore containing said metallic oxide.

37. Method according to claim 36, in which said iron sponge produced by partial reduction of iron ore or iron sand has a percentage reduction within the range of 60 to 98% reduction measured as the percentage of oxygen combined with iron which has been removed from the ore on its reduction.

38. Method according to claim 36 in which said partly reduced iron sponge is produced by direct reduction of a titaniferrous iron sand or a concentrate thereof.

39. The method according to claim 22, comprising an initial blowing stage carried out intermediate steps (i) and (ii), this initial blowing being carried out with an initial blowing gas which is not reducing to wustite, the initial blowing gas being selected from the group consisting of oxygen, air, a decarburizing feed gas, comprising a mixture selected from the group consisting of carbon dioxide, carbon monoxide, hydrogen and water, and mixtures which generate carbon monoxide, carbon dioxide, hyrogen and water vapor in situ in said converter and which has a "H ratio" of greater than 0.45, and mixtures thereof and wherein the primary decarburizing feed gas has an "H ratio" of less than 0.45.

40. The method in accordance with claim 39, in which the oxidizing potential is progressively reduced between the start of the initial blowing stage and the completion of the blowing in step (ii).

* * * * *